(12) United States Patent
Stepanich et al.

(10) Patent No.: US 8,977,244 B2
(45) Date of Patent: *Mar. 10, 2015

(54) EXTENSIBLE PHONE APPLICATION

(75) Inventors: Darron Jack Stepanich, Seattle, WA (US); Kevin Alan Kennedy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/205,861

(22) Filed: Aug. 9, 2011

(65) Prior Publication Data
US 2011/0294486 A1 Dec. 1, 2011

Related U.S. Application Data

(63) Continuation of application No. 10/401,009, filed on Mar. 26, 2003, now Pat. No. 8,000,686.

(60) Provisional application No. 60/420,359, filed on Oct. 21, 2002.

(51) Int. Cl.
*H04M 3/42* (2006.01)
*H04M 1/725* (2006.01)
*H04M 1/57* (2006.01)

(52) U.S. Cl.
CPC .......... *H04M 1/72522* (2013.01); *H04M 1/576* (2013.01)
USPC ........ 455/414.1; 455/417; 455/418; 455/419; 455/456.3; 455/555; 455/566; 379/142.01; 379/142.08; 379/142.14; 379/142.17; 379/93.23; 379/93.25

(58) Field of Classification Search
USPC .......... 455/414.1, 417, 418, 419, 456.3, 555, 455/566; 379/142.01, 142.08, 142.14, 379/142.17, 93.23, 93.25
See application file for complete search history.

(56) References Cited

U.S. PATENT DOCUMENTS

| | | | |
|---|---|---|---|
| 5,745,850 A | 4/1998 | Aldermeshian et al. ....... | 455/417 |
| 5,987,104 A | 11/1999 | Tomimori .................. | 379/93.23 |
| 6,243,448 B1 | 6/2001 | Corbett et al. ............. | 379/93.35 |
| 6,331,972 B1 | 12/2001 | Harris et al. ................. | 370/313 |
| 6,456,857 B1 | 9/2002 | Bos et al. .................... | 455/550.1 |
| 6,512,819 B1 | 1/2003 | Sato et al. .................. | 379/93.23 |
| 6,687,901 B1 | 2/2004 | Imamatsu ..................... | 717/173 |
| 7,120,429 B2 | 10/2006 | Minear et al. ................. | 455/419 |
| 8,000,686 B2 | 8/2011 | Stepanich .................. | 455/414.1 |
| 2001/0034237 A1 | 10/2001 | Garahi .......................... | 455/456 |
| 2002/0087628 A1 | 7/2002 | Rouse et al. .................. | 709/203 |
| 2002/0193094 A1 | 12/2002 | Lawless et al. ............... | 455/407 |
| 2003/0022659 A1 | 1/2003 | Mun et al. .................... | 455/415 |
| 2004/0022384 A1 | 2/2004 | Flores et al. ............. | 379/265.13 |
| 2005/0026603 A9 | 2/2005 | Rajaram ....................... | 455/419 |

*Primary Examiner* — Quynh Nguyen
(74) *Attorney, Agent, or Firm* — Judy Yee; Micky Minhas

(57) ABSTRACT

The present invention provides an extensible phone application that uses extensions to interact with other applications executing in a mobile communication device. The extensible phone application is operable to handle wireless communication for the mobile communication device. Another application may interact with the extensible phone application by incorporating an extension. The extensible phone application enables the extension to register with the phone application for receiving a notification associated with an event. In response to the event, the extensible phone application sends the notification to the extension.

20 Claims, 7 Drawing Sheets

EXTENSIBLE PHONE APPLICATION

CLAIM OF PRIORITY

This application is a continuation of and claims priority to application Ser. No. 10/401,009, filed Mar. 26, 2003, entitled EXTENSIBLE PHONE APPLICATION, and which further claims priority to U.S. Provisional Application No. 60/420,359, filed on Oct. 21, 2002, all of which are hereby incorporated in their entirety by reference.

BACKGROUND OF THE INVENTION

Mobile telephones are increasingly becoming more than just wireless voice communication devices. In addition to handling voice data, some modern mobile telephones are essentially portable computing devices that can support a variety of applications such as email, Web browser, note and word processing applications, contact applications, scheduling applications, games, and the like. However, these applications are often coded by different developers and typically have limited interaction with each other.

SUMMARY OF THE INVENTION

Briefly stated, the present invention provides an extensible phone application that uses extensions to interact with other applications executing in a mobile communication device. The extensible phone application is operable to handle wireless communication for the mobile communication device. Another application may interact with the extensible phone application by incorporating an extension. The extensible phone application enables the extension to register with the phone application for receiving a notification associated with an event. In response to the event, the extensible phone application sends the notification to the extension.

In one aspect, the invention is directed at a computer-implemented method for configuring an application in a mobile communication device. The computer-implemented method includes an extension in the application. The extension is operable to communicate with an extensible phone application configured to handle wireless communication for the mobile communication device. The extension may register with the extensible phone application. In response to receiving a notification from the extensible phone application associated with a wireless communication event, the application performs an operation based the notification.

In another aspect, the invention is directed at a computer-implemented method for configuring a mobile communication device. The computer-implemented method provides an extensible phone application and another application to the mobile communication device. The extensible phone application is configured to handle wireless communication for the mobile communication device. The other application is configured with an extension for interacting with the extensible phone application. The computer-implemented method registers the extension with the extensible phone application to receive a notification in response to an event, such as a call.

In yet another aspect, the invention is directed at a method of communicating between an extensible phone application and another application in a mobile communication device. The method enables the other application to communicate with the extensible phone application using an extension. The other application sends a notification request for an event associated with wireless communication to the extensible phone application. The extensible phone application receives the notification request, determines an occurrence of the event identified in the notification request, and sends a notification associated with the event to the other application.

In still another aspect, the invention is directed at a mobile communication device with a memory encodes with an extensible phone application and a second application. The extensible phone application is configured to handle wireless communication for the mobile communication device, to determine an event related to wireless communication, and to send a notification associated with the event to an extension registered with it. The notification includes data about the event. The second application is configured with the extension. The second application is further configured to receive the notification and to incorporate the data about the event in an operation.

In still yet another aspect, the invention is directed at a computer-readable medium encoded with a data structure that includes three data fields. The first data field has a first computer-executable component configured to enable an extension to register with it and to send a notification associated with an event to the extension in response to the event. The second data field has with a second computer-executable component. The third data field is incorporated into the second data field. The third data field has the extension configured with computer-executable instructions for interacting with the first computer-executable component.

DETAILED DESCRIPTION OF THE PREFERRED EMBODIMENT

The inventors of the present invention have determined that a mobile communication device that is configured to readily integrate applications into its operations will greatly enhance the capabilities of the device. The inventors have also appreciated that a mobile communication device configured in such an application-friendly manner will encourage more developers to create software for the device. Thus, the present invention focuses on an extensible phone application for a mobile communication device that enables other applications in the device to efficiently and effectively interact with it. The extensible phone application is configured to handle wireless communication for the mobile communication device. The extensible phone application is also configured to provide extensions that may be used by other applications in the mobile communication device to access data and features associated with wireless communication. For example, applications may use these extensions to register to receive notifications for specific events associated with wireless communication and to interact with the extensible phone application.

A mobile communication device with an extensible phone application provides a superior platform for applications created by software developers. The extensible phone application enables developers to enhance and extend the functionality of the device to meet their own specific needs. The extensible phone application also enables developers to implement custom solutions that meet hardware and wireless carrier requirements. These and other aspects of the invention will become apparent after reading the following detailed description.

Figure 1:
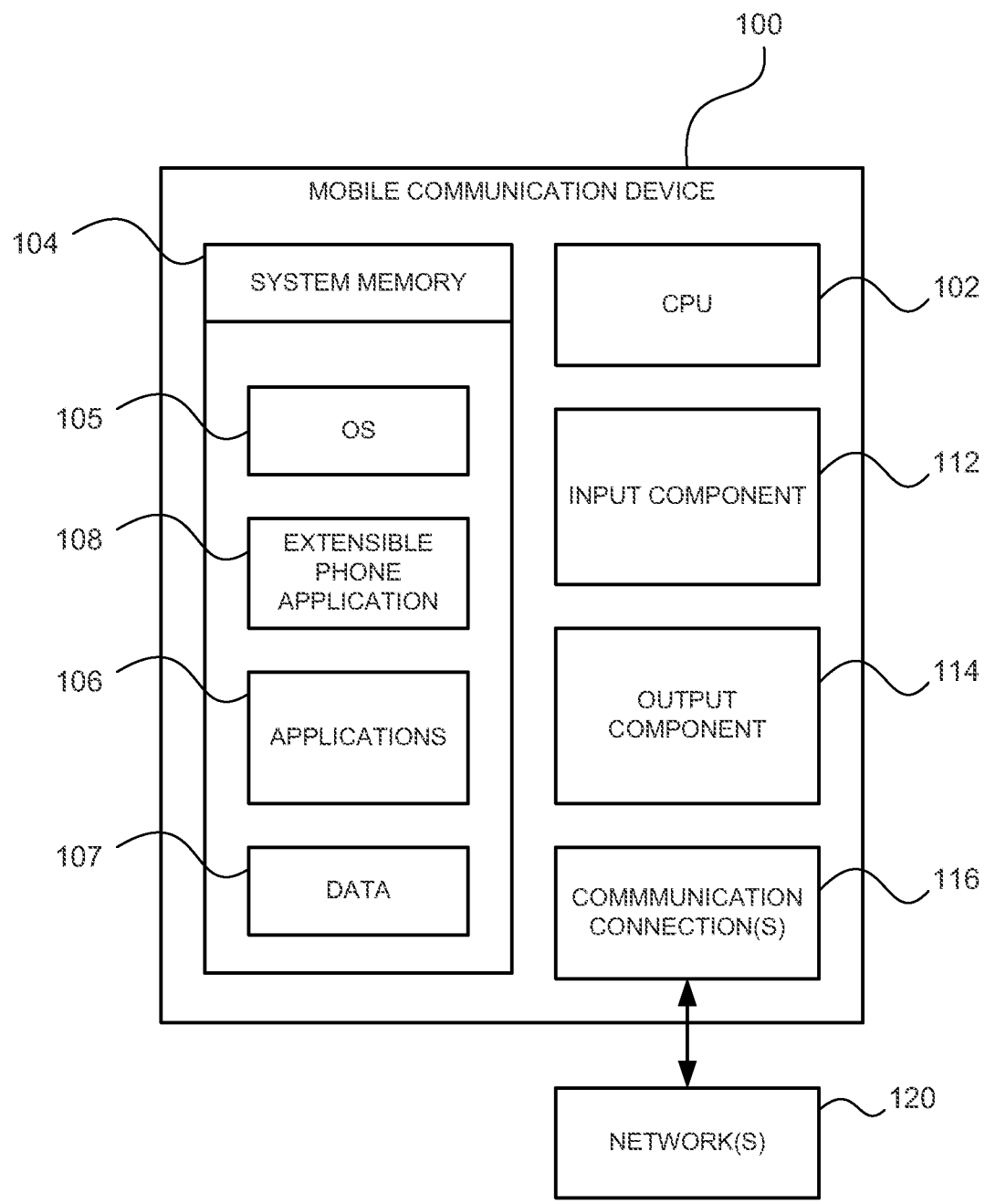
FIG. 1 illustrates an exemplary mobile communication device.

FIG. 1 illustrates an exemplary mobile communication device 100 that may be used in one exemplary embodiment of the present invention. It is to be understood that many different kinds of mobile communication devices may implement this invention. These mobile communication devices include wireless phones, personal digital assistants, laptop and portable computers, and the like. For illustrative purposes, a general mobile communication device 100 will be described. A mobile communication device that is capable of implementing this invention may have more, less, or different components as those shown in FIG. 1.

Mobile communication device 100 may include various hardware components. In a very basic configuration, mobile communication device 100 typically includes a central processing unit 102, system memory 104, and one or more communication connections 116. Depending on the exact configuration and type of mobile communication device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile communication device 100. Any such computer storage media may be part of device 100. Mobile communication device 100 may also contain input component 112 for inputting data and output component 114 for displaying data.

Mobile communication device 100 may also contain communication connections 116 that allow the device to communicate with other mobile communication devices over network 120, such as a wireless network, local area network, wide area network such as the Internet, and other communication networks. Signals generated by communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of mobile communication device 100 are typically stored in system memory 104. System memory 104 typically includes an operating system 105, one or more applications 106, an extensible phone application 108, and data 107. Extensible phone application 108 may be an independent component or be incorporated into operating system 105. Extensible phone application 108 and extensions will be discussed in more detail in conjunction with FIG. 2. Briefly stated, extensible phone application 108 is a computer-executable component that handles wireless communication for mobile communication device 100. Extensible phone application 108 is configured to use extensions to interact with applications 106.

Applications 106 are computer-executable components that operate in mobile communication device 100. Applications 106 may use extensions for interacting with extensible phone application 108. These extensions may be implemented in a variety of ways. In one embodiment of the invention, extensions are incorporated in applications 106. The extensions may register with extensible phone application 108 to receive information from, to communicate with, and to control the operations of extensible phone application 108.

Figure 2:
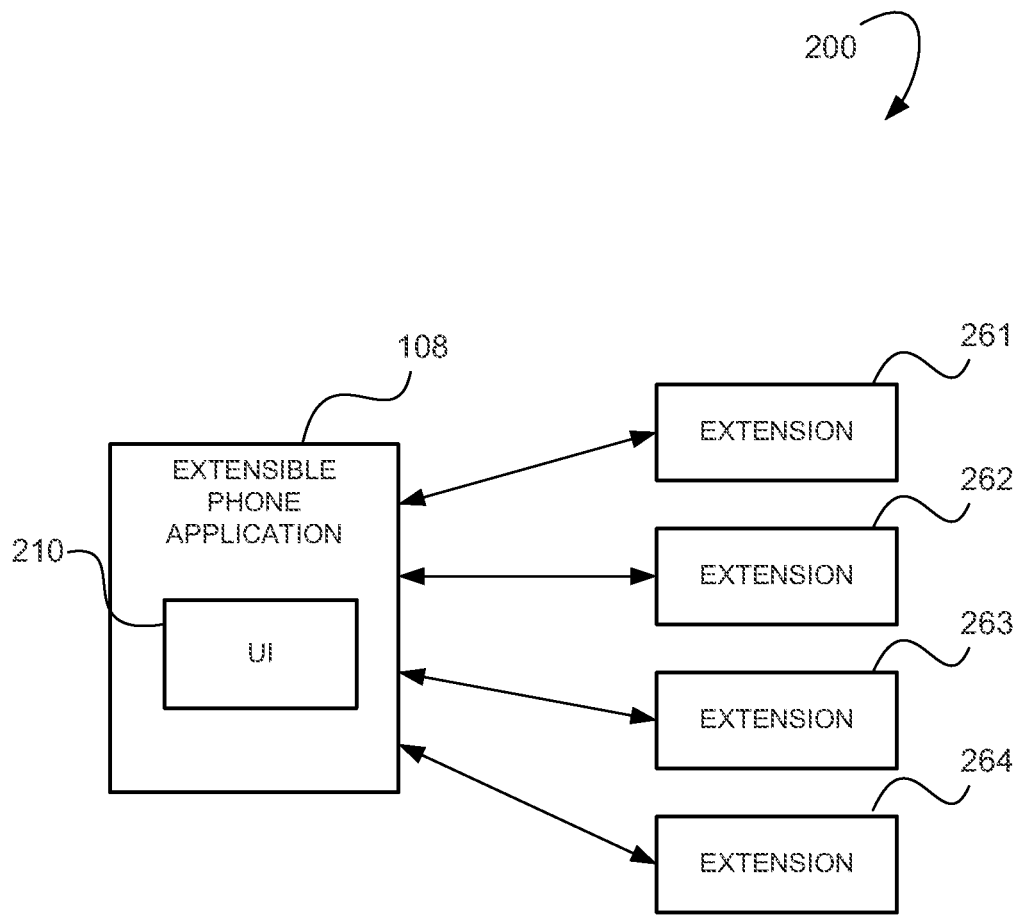
FIG. 2 is a schematic diagram of an exemplary extensible phone application system.

FIG. 2 is a schematic diagram of an exemplary extensible phone application system 200. Illustrated are an extensible phone application 108 and extensions 261-264. Extensible phone application 108 is a software component of a mobile communication device. Extensible phone application 108 enables a user to control the operations of mobile communication device associated with wireless voice and data communication. As illustrated in the figure, extensible phone application 108 is configured to provide a user interface 210 for interacting with a user. User interface 210 may display information to the user and to enable the user to issue commands.

Extensible phone application 108 is also configured to interact with other applications executing on the mobile communication device. Extensible phone application 108 may interact with the other applications using extensions, such as extensions 261-264. Extensions 261-264 are software devices that may be implemented by applications executing on the mobile communication device to interact with extensible phone application 108.

In operation, extensions 261-264 may register with extensible phone application 108 to request for various types of interactions. Many types of interactions are possible. For example, extensible phone application 108 may send notifications to extension 261-264. Notifications may include an indicator for an event, such as new call, call ended, call on hold, and the like. Notifications may also include data, such as caller ID, wireless carrier information, location information, etc. The applications may also send data to and control certain operations of extensible phone application 108. Extensible phone application 108 may incorporate the data in user interface 210. Therefore, one or more embodiments include updating a display that is associated with the phone component using information generated by at least one of the software extensions. The data may be incorporated without disrupting the operations of the extensible phone application 108.

Figure 3:
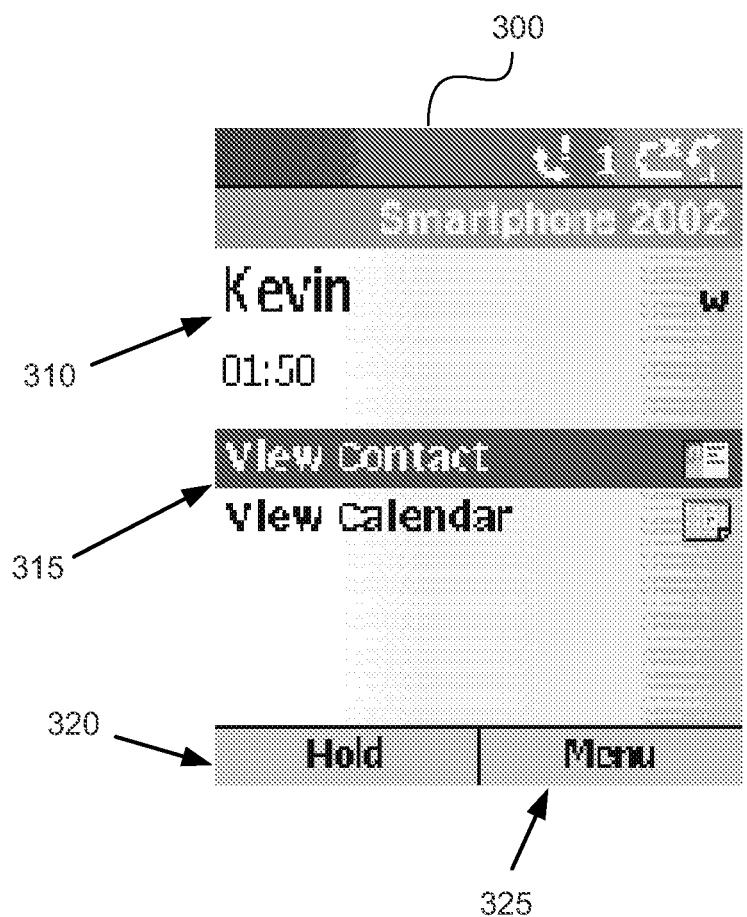
FIG. 3 is a screenshot of an exemplary user interface without displaying data from any installed extension.
Figure 4:
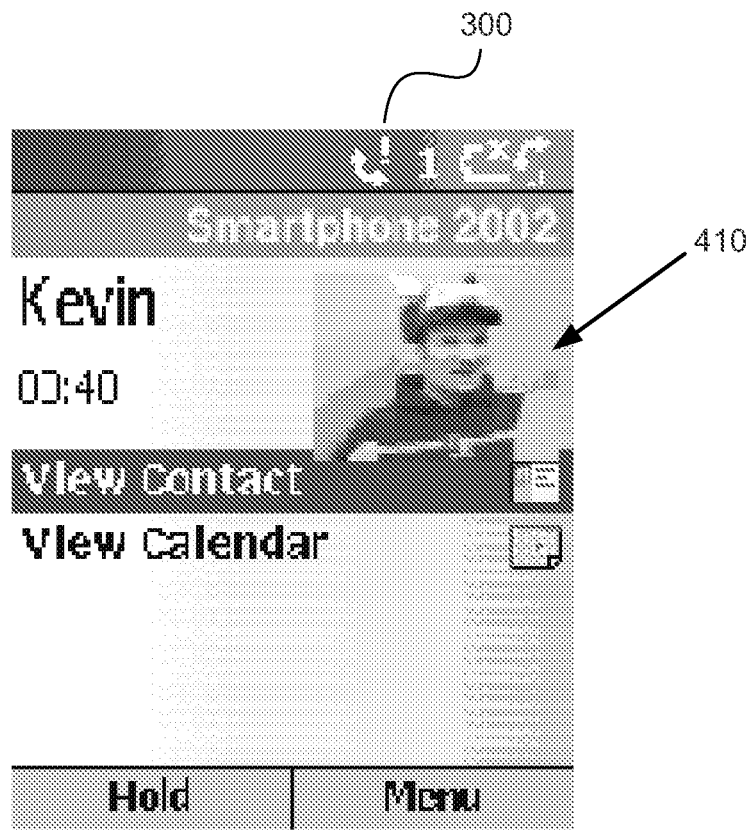
FIG. 4 is another screenshot of an exemplary user interface displaying data from a picture caller ID extension.

FIGS. 3 and 4 are screenshots of an exemplary user interface 300 of an extensible phone application. FIG. 3 is a screenshot of the exemplary user interface 300 without displaying data from any installed extension. User interface 300 may be displayed on a touch screen of a mobile communication device. User interface 300 includes a data display area 310 for displaying data related to phone calls. As illustrated, the data display area 310 displays the caller ID of a call, which shows that the caller is Kevin. User interface 300 may also include an application selection menu 315, a call hold trigger 320, a menu activation trigger 325, and other display and user selectable items. A user may issue commands to the extensible phone application by activating the triggers. For example, a user may elect to hold a call by pressing on the touch screen where call hold trigger 320 is displayed.

FIG. 4 is another screenshot of the exemplary user interface 300 displaying data from a picture caller ID extension. In this example, the extensible phone application is interacting with a picture caller ID application. The picture caller ID application is configured to determine a digital photograph associated with a caller ID. The picture caller ID application includes an extension for interacting with the extensible phone application. The extension may be incorporated into the picture caller ID application.

Using the extension, the picture caller ID application is configured to register with the extensible phone application and to receive a notification for a caller ID. After determining a digital photograph associated with the caller ID, the picture caller ID application is also configured to display the digital photograph on user interface 300. Many configurations are possible for the picture caller ID application to display the digital photograph. For example, the picture caller ID application may configure user interface 300 to display the digital photograph. The picture caller ID application may also send the digital photograph to the extensible phone application so that the extensible phone application can display it on user interface 300. As shown in the screenshot, a photo of Kevin is displayed in the data display area 310 to show that Kevin is the caller.

Figure 5:
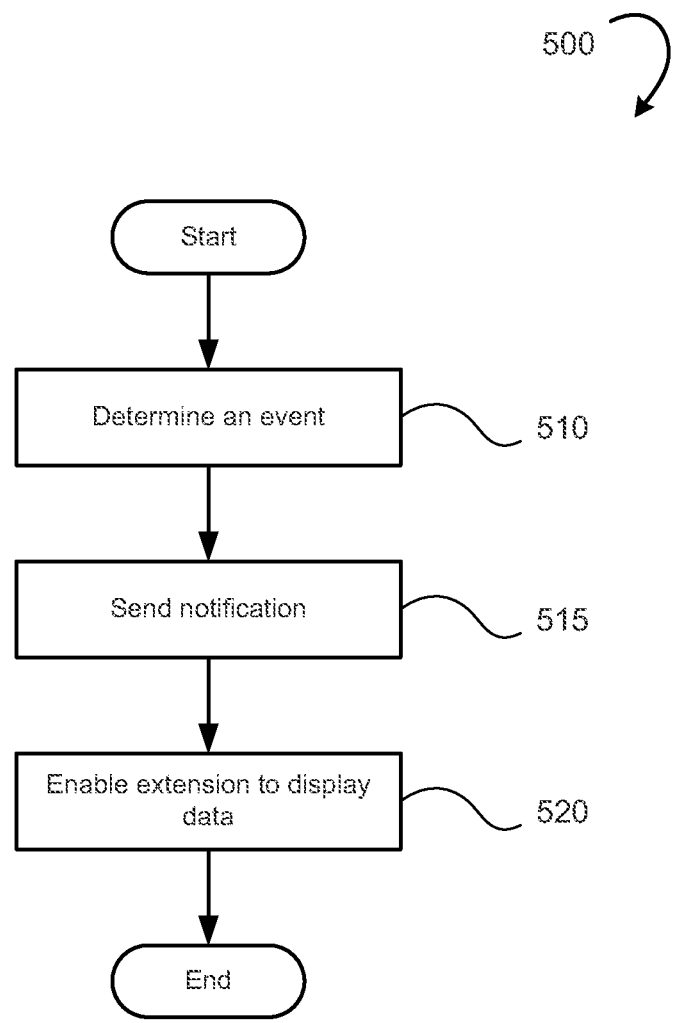
FIG. 5 is an operational flow diagram of an exemplary process that may be used by an extensible phone application to interact with extensions.

FIG. 5 is an operational flow diagram of an exemplary process 500 that may be used by an extensible phone application to interact with extensions. Moving from a start block, process 500 goes to block 510 where an event is determined. The event may be any wireless communication related event. At block 515, a notification of the event is sent to one or more extensions that are registered to receive such notifications. Each extension is associated with an application. At block 520, the extensible phone application enables the extensions to display the data. For example, the extensible phone application may receive data from an application through an extension. The extensible phone application then displays the data on a user interface. The extensible phone application may also enable the extension to directly display the data on a user interface. Process 500 then ends.

Figure 6:
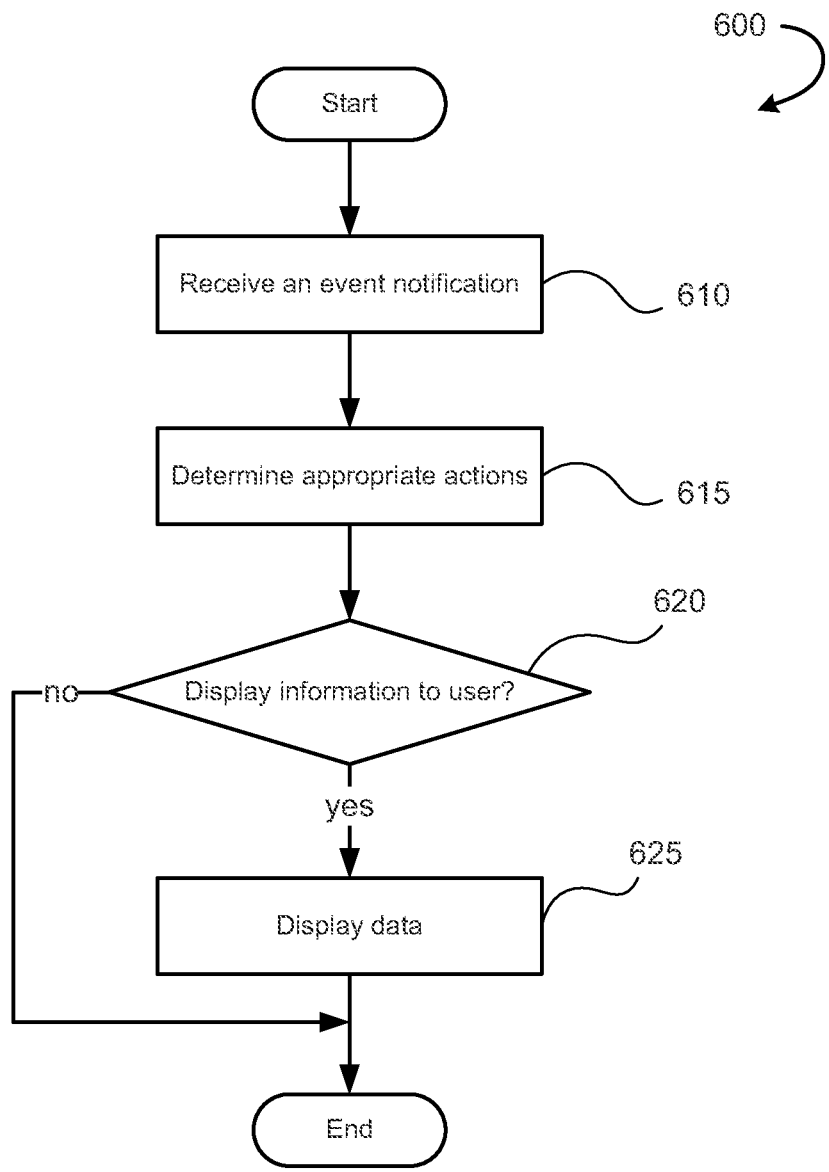
FIG. 6 is an operational flow diagram of an exemplary process that may be used by an application to interact with an extensible phone application.

FIG. 6 is a schematic flow diagram of an exemplary process 600 that may be used by an application to interact with an extensible phone application. From a start block, process moves to block 610 where a notification is received through an extension associated with the application. The extension may be incorporated into the application. At block 615, the appropriate actions are determined. At block 620, a determination is made whether to display information on a user interface of the extensible phone application. If not, the process ends. If so, process 600 goes to block 625 where the appropriate data are displayed by the extension. Then, process 600 ends.

Figure 7:
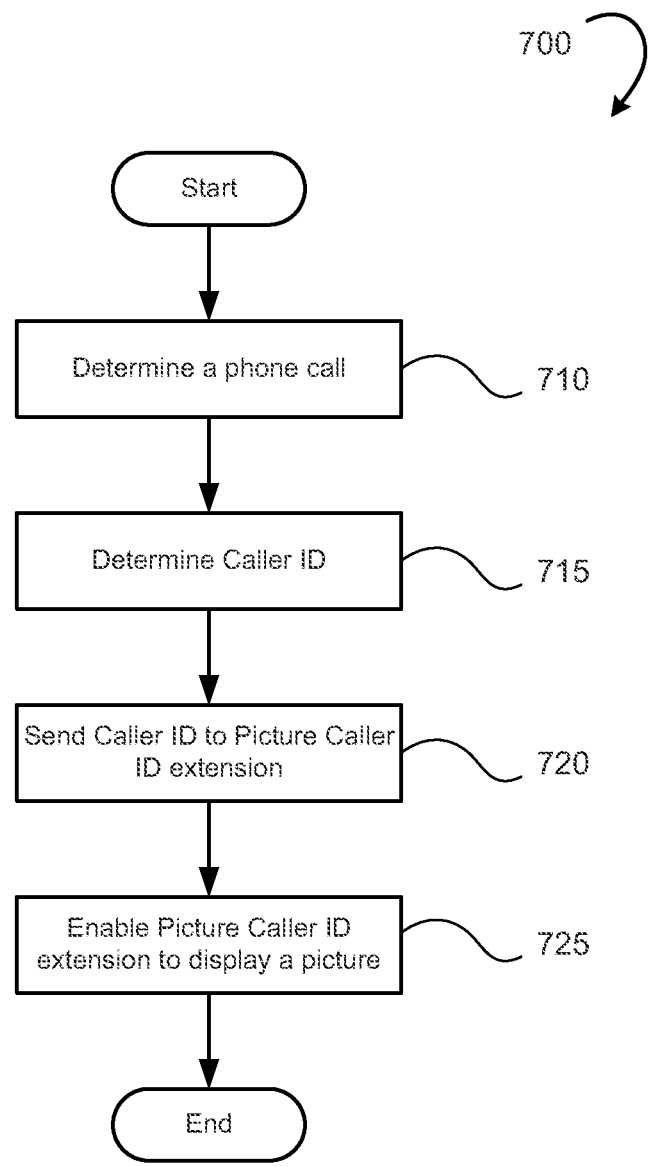
FIG. 7 is an operational flow diagram of an exemplary process that may be used by an extensible phone application to interact with a picture caller ID extension.

FIG. 7 is a schematic flow diagram of an exemplary process 700 that may be used by an extensible phone application to interact with a picture caller ID extension. From a start block, process 700 moves to block 710 where a phone call is determined. At block 715, the caller ID of the phone call is determined. At block 720, the caller ID is sent to the picture caller ID extension. At block 725, the call ID extension may display a digital picture of the caller on a user interface. Process 700 then ends.

Appendix A and Appendix B of this application include some exemplary program codes that may be used to implement this invention.

The above specification, examples and data provide a complete description of the invention. Since many embodiments of the invention can be made without departing from the spirit and scope of the invention, the invention resides in the claims hereinafter appended.

APPENDIX A

```
////////////////////////////////////////////////////////////////////////
////////
//
//  This is "Sample Code" and is distributable subject to the terms of
the end
//  user license agreement.
//
////////////////////////////////////////////////////////////////////////
//////// include <windows.h>
include <windowsx.h>
#include <tchar.h>
#include <malloc.h>
#include <memory.h>
include <ocidl.h> include "commctrl.h"
include "peext.h"
#include "aygshell.h"
#include "tpcuser.h"
#include "testext.h"
/*

*** Stuff to add to project.reg to enable this:

[HKEY_CLASSES_ROOT\CLSID\{8A045456-3477-4b18-9D04-CE8C939E4F0B}]

[HKEY_CLASSES_ROOT\CLSID\{8A045456-3477-4b18-9D04-
CE8C939E4F0B}\InprocServer32]
@="testext.dll"

[HKEY_LOCAL_MACHINE\Software\Microsoft\Shell\Extensions\Generic\Phone\E
vents\{8A045456-3477-4b18-9D04-CE8C939E4F0B}]
    @=""

*** Stuff to add to project.bib
   testext.dll       $(_FLATRELEASEDIR)\testext.dll              NK
SR

*/ define WM_TESTEXT_TALKING (WM_APP + 1)

HINSTANCE g_hInst;
#define IMAGENAME TEXT("testext.dll")
ULONG g_dwDLLRefCount = 0;

#define INITGUID
#include "initguid.h"
// {8A045456-3477-4b18-9D04-CE8C939E4F0B}
```

```
// If you are creating a new extension based on this code
// change the clsid!
DEFINE_GUID(CLSID_TESTEXT,0x8a045456, 0x3477, 0x4b18, 0x9d, 0x4, 0xce,
0x8c, 0x93, 0x9e, 0x4f, 0xb);
#define CLSIDTEXT_TESTEXT TEXT("8A045456-3477-4b18-9D04-CE8C939E4F0B")

DEFINE_GUID(IID_IDispatch,       0x00020400, 0x0000, 0x0000, 0xC0,
0x00, 0x00, 0x00, 0x00, 0x00, 0x00, 0x46);

DEFINE_GUID(IID_IObjectWithSite, 0xFC4801A3, 0x2BA9, 0x11CF, 0xA2,
0x29, 0x00, 0xAA, 0x00, 0x3D, 0x73, 0x52);

#include <COGUID.H>
#undef INITGUID

// Helper for writing information to the debugger.
TCHAR g_szBuffer[2000];
void DebugOut(const TCHAR* szFormat, ...)
{
    va_list vaMarker;

va_start(vaMarker, szFormat);
    wvsprintf(g_szBuffer, szFormat, vaMarker);
    va_end(vaMarker);

#ifdef DEBUG
    OutputDebugString(g_szBuffer);
    #endif
}

// BOOL WINAPI DllMain( HANDLE hInstDll, DWORD fdwReason, LPVOID
lpvReserved) { extern "C" BOOL WINAPI DllMain(
    HANDLE hinstDll, /*@parm Instance pointer. */
    DWORD   dwReason, /*@parm Reason routine is called. */
    LPVOID  lpReserved /*@parm system parameter. */
    )
{
    DebugOut(TEXT("TestExtension - DllMain\r\n"));

switch (dwReason)
        {
        case DLL_PROCESS_ATTACH:
            g_hInst = (HINSTANCE)hinstDll;
            break;
        } return TRUE;
} class MyClassFactory : public IClassFactory
{
    int m_cRef;
```

```
public:
    MyClassFactory();
    virtual ~MyClassFactory();

// IUnknown interface
    STDMETHODIMP QueryInterface(REFIID riid, void** ppObject);
    STDMETHODIMP_(ULONG) AddRef() { m_cRef++; return m_cRef; }
    STDMETHODIMP_(ULONG) Release() {m_cRef--; if(m_cRef > 0) {
return(m_cRef); } delete this; return 0; }

STDMETHODIMP CreateInstance(IUnknown *pUnkOuter, REFIID riid,
void** ppObject);
    STDMETHODIMP LockServer(BOOL fLock);
};

#define IDT_TEXTEXT_ANIMATION 1
#define CMS_TEXTEXT_ANIMATION 500

BOOL g_iStep;
const int c_cSteps = 2;
BITMAP g_bmpAni;
HBITMAP g_hbmpAni;

LRESULT CALLBACK TestExtWndProc(HWND hwnd, UINT uMsg, WPARAM wParam,
LPARAM lParam)
{
    LRESULT lres = 0;

switch(uMsg)
        {
        case WM_DESTROY:
            DeleteObject(g_hbmpAni);
            break;

case WM_PAINT:
            {
            PAINTSTRUCT ps;
            HDC hdc;
            HBITMAP hbmpOld;
            HDC hdcBmp;
            int cxStep = g_bmpAni.bmWidth / 2;

hdc = BeginPaint(hwnd, &ps);
            hdcBmp = CreateCompatibleDC(hdc);
            hbmpOld = (HBITMAP)SelectObject(hdcBmp, g_hbmpAni);

BitBlt(hdc, 0, 0, cxStep, g_bmpAni.bmHeight, hdcBmp,
g_iStep * cxStep, 0, SRCCOPY);

SelectObject(hdcBmp, hbmpOld);
            DeleteDC(hdcBmp);

EndPaint(hwnd, &ps);
```

```
            }
            break;

case WM_TESTEXT_TALKING:
            if(wParam >= 1)
                {
                // Start the talking animation
                SetWindowPos(hwnd, HWND_TOP, 0,0,0,0, SWP_NOACTIVATE |
SWP_NOMOVE | SWP_NOOWNERZORDER | SWP_NOSIZE);
                SetTimer(hwnd, IDT_TEXTEXT_ANIMATION,
CMS_TEXTEXT_ANIMATION, 0);
                g_iStep = 0;
                }
            else
                {
                // End the talking animation
                SetWindowPos(hwnd, HWND_BOTTOM, 0,0,0,0, SWP_NOACTIVATE
| SWP_NOMOVE | SWP_NOOWNERZORDER | SWP_NOSIZE);
                KillTimer(hwnd, IDT_TEXTEXT_ANIMATION);
                }
            break;

case WM_TIMER:
            switch(wParam)
                {
                case IDT_TEXTEXT_ANIMATION:
                    g_iStep++;
                    if(g_iStep >= c_cSteps)
                        {
                        g_iStep = 0;
                        }
                    InvalidateRect(hwnd, NULL, FALSE);
                    UpdateWindow(hwnd);
                    break;
                }
            break;

default:
            lres = DefWindowProc(hwnd, uMsg, wParam, lParam);
            break;
        } return(lres);
}

HRESULT CreateTestExtWindow(
    HWND hwndParent,
    HWND* phwnd
    )
{
    HRESULT hr = S_OK;
    RECT rcParent;
    WNDCLASS wc;
```

```
    HWND hwndNew;
    int cxBmp;

// Register our main window's class.
    ZeroMemory(&wc, sizeof(wc));
    wc.style = CS_HREDRAW | CS_VREDRAW ;
    wc.lpfnWndProc = TestExtWndProc;
    wc.hInstance = g_hInst;
    wc.hbrBackground = (HBRUSH)GetStockObject(WHITE_BRUSH);
    wc.lpszClassName = TEXT("TestExt");
    if(!RegisterClass(&wc))
        {
        hr = E_FAIL;
        goto Error;
        }

// Load the image we are animating
    g_hbmpAni = (HBITMAP)LoadImage(g_hInst, MAKEINTRESOURCE(IDB_ANI),
IMAGE_BITMAP, 0, 0, 0);
    if(!g_hbmpAni)
        {
        hr = E_FAIL;
        goto Error;
        }
    if(!GetObject(g_hbmpAni, sizeof(g_bmpAni), &g_bmpAni))
        {
        hr = E_FAIL;
        goto Error;
        }
    cxBmp = g_bmpAni.bmWidth / 2;
    // Create the main window.
    GetClientRect(hwndParent, &rcParent);
    hwndNew = CreateWindow(wc.lpszClassName, NULL,
            WS_CHILD | WS_VISIBLE | WS_CLIPSIBLINGS,
            rcParent.right - (cxBmp + 5), 5, cxBmp, g_bmpAni.bmHeight,
            hwndParent, NULL, NULL, NULL );
    if(!hwndNew)
        {
        hr = E_FAIL;
        goto Error;
        } if(phwnd)
        {
        *phwnd = hwndNew;
        }

Error:
    DebugOut(TEXT("TextExtension - CreateTestExtWindow() %s\r\n"),
SUCCEEDED(hr) ? TEXT("SUCCEEDED") : TEXT("FAILED"));
    return(hr);
}
```

```
class TestExtension :
    public IObjectWithSite,
    public IDispatch
{
    LONG m_cRef; // COM refcount
    IUnknown* m_pSite;
    HWND m_hwndDisplay;

TestExtension() : m_cRef(1), m_pSite(NULL), m_hwndDisplay(NULL)
    {
        Reset();
        DebugOut(TEXT("TestExtension::TestExtension() - created"));
        g_dwDLLRefCount++;
    }
    virtual ~TestExtension()
    {
        Reset();
        ASSERT(0 == m_cRef);
        DebugOut(TEXT("TestExtension::~TestExtension() - destructed"));
        g_dwDLLRefCount--;
    }
    void Reset()
    {
    if(m_pSite)
        {
        m_pSite->Release();
        m_pSite = NULL;
        }
    }
    HRESULT Initialize() {return(S_OK);}

// IUnknown
    STDMETHODIMP QueryInterface(REFIID iid, LPVOID * ppv)
    {   HRESULT hr = S_OK;
        *ppv = NULL;
        if(IID_IUnknown == iid){*ppv =
static_cast<IObjectWithSite*>(this);}
        else if(IID_IObjectWithSite == iid){*ppv =
static_cast<IObjectWithSite*>(this);}
        else if(IID_IDispatch == iid){*ppv =
static_cast<IDispatch*>(this);}
        else{DEBUGMSG(TRUE, (TEXT("TestExtension::QueryInterface -
Interface not supported\r\n"))); hr = E_NOINTERFACE; goto Error;}
        (reinterpret_cast<IUnknown*>(*ppv))->AddRef();
    Error:
        return(hr);
    }
    STDMETHODIMP_(ULONG) AddRef() {return
InterlockedIncrement(&m_cRef);}
    STDMETHODIMP_(ULONG) Release() {if(0 ==
InterlockedDecrement(&m_cRef)) {delete this; return(0);}
return(m_cRef);}

// IObjectWithSite methods
    virtual STDMETHODIMP SetSite(IUnknown* pSite)
```

```
    {
        DebugOut(TEXT("TestExtension::SetSite(0x%08x)\r\n"), pSite);
        if(m_pSite)
            {
            m_pSite->Release();
            m_pSite = NULL;
            } if(pSite)
            {
            m_pSite = pSite;
            m_pSite->AddRef();
            }
        return(S_OK);
    }
    virtual STDMETHODIMP GetSite(REFIID riid, void** ppvSite)
    {
        HRESULT hr = S_OK;
        DebugOut(TEXT("TestExtension::GetSite()\r\n"));
        if(!m_pSite) {hr = E_FAIL; goto Error;}
        if(FAILED(hr = m_pSite->QueryInterface(riid, ppvSite))) { goto Error; }
    Error:
        return(hr);
    }

// IDispatch methods
    virtual HRESULT STDMETHODCALLTYPE GetTypeInfoCount(UINT* pctinfo)
    {
        *pctinfo = 0;
        return(S_OK);
    }
    virtual HRESULT STDMETHODCALLTYPE GetTypeInfo(UINT iTInfo, LCID lcid, ITypeInfo** ppTInfo)
    {
        return(E_FAIL); // client shouldn't be asking for types since we told them there are none in GetTypeInfoCount
    }
    virtual HRESULT STDMETHODCALLTYPE GetIDsOfNames(REFIID riid, LPOLESTR* rgszNames, UINT cNames, LCID lcid, DISPID* rgDispId)
    {
        return(E_NOTIMPL);
    }
    virtual HRESULT STDMETHODCALLTYPE Invoke(DISPID dispIdMember, REFIID riid, LCID lcid, WORD wFlags,
            DISPPARAMS* pDispParams, VARIANT* pVarResult, EXCEPINFO* pExcepInfo, UINT* puArgErr)
    {
        struct dispName
            {
            DISPID id;
            const TCHAR* pszName;
            };
        #define MAKEDISPNAME(x) {x, TEXT( #x )},
        static const dispName s_rgdisps[] =
```

```
        {
        MAKEDISPNAME(PEDISP_CALLER_ID)
        MAKEDISPNAME(PEDISP_INCOMING)
        MAKEDISPNAME(PEDISP_TALKING)
        MAKEDISPNAME(PEDISP_HELD)
        MAKEDISPNAME(PEDISP_CONNECTED)
        MAKEDISPNAME(PEDISP_NEW_SITE_HWND)
        {0, TEXT("")} // end of list
        };

HRESULT hr = S_OK;
    int iParam;
    TCHAR szBuf[300];
    const dispName* pName;

if(IID_NULL != riid) {hr = E_FAIL; goto Error; }
    if(0 != lcid) {hr = E_FAIL; goto Error; }
    if(!(wFlags & DISPATCH_METHOD)) {hr = E_FAIL; goto Error; }
    for(pName = s_rgdisps; pName->pszName[0] && pName->id !=
dispIdMember; pName++)
        ;
    wsprintf(szBuf, TEXT("TestExtension::Invoke(%20s (%4d))"),
pName->pszName, dispIdMember);
    for(iParam = pDispParams->cArgs - 1; iParam >= 0; iParam--)
        {
        VARIANTARG* pArg = pDispParams->rgvarg + iParam;

switch(pArg->vt)
            {
            case VT_INT:
                wsprintf(szBuf + _tcslen(szBuf), TEXT("[i,%d]"),
pArg->intVal);
                break;

case VT_UINT:
                wsprintf(szBuf + _tcslen(szBuf), TEXT("[ui,%d]"),
pArg->uintVal);
                break;

case VT_BSTR:
                wsprintf(szBuf + _tcslen(szBuf), TEXT("[s,%s]"),
pArg->bstrVal);
                break;

case VT_BOOL:
                wsprintf(szBuf + _tcslen(szBuf), TEXT("[b,%s]"),
(pArg->boolVal == 0) ? TEXT("F") : TEXT("T"));
                break;
            default:
                wsprintf(szBuf + _tcslen(szBuf), TEXT("[?]"));
                break;
            }

}
    wsprintf(szBuf + _tcslen(szBuf), TEXT("\r\n"));
```

```
            DebugOut(szBuf);

switch(dispIdMember)
            {
            case PEDISP_NEW_SITE_HWND:
                CreateTestExtWindow((HWND)pDispParams->rgvarg[0].uintVal, &m_hwndDisplay);
                break;

case PEDISP_TALKING:
                if(m_hwndDisplay)
                    {
                    SendMessage(m_hwndDisplay, WM_TESTEXT_TALKING, pDispParams->rgvarg[0].intVal, 0);
                    }
                break;
            }
    Error:
        return(hr);
        } public:
    static HRESULT Create(IObjectWithSite** ppNew)
        {
        HRESULT hr = S_OK;
        TestExtension* pte = NULL;

pte = new TestExtension();
        ASSERT((!pte) || (1 == pte->m_cRef));
        if(!pte)   {hr = E_OUTOFMEMORY; goto Error; }
        if(FAILED(hr = pte->Initialize())) {goto Error;}

*ppNew = pte;
        pte = NULL;

Exit:
        return(hr);

Error:
        delete(pte);
        goto Exit;
        }
};

MyClassFactory::MyClassFactory() :
    m_cRef(1)
{
}

MyClassFactory::~MyClassFactory()
{
}

HRESULT MyClassFactory::QueryInterface(
    REFIID riid,
```

```
    void** ppObject
    )
{
    HRESULT hr = S_OK;

if(riid == IID_IUnknown || riid == IID_IClassFactory)
        {
        *ppObject= (IClassFactory*)this;
        }
    else
        {
        hr = E_NOINTERFACE;
        goto Error;
        }

AddRef();

Error:
    return(hr);
}

HRESULT MyClassFactory::CreateInstance(
    IUnknown *pUnkOuter,
    REFIID riid,
    void** ppObject
    )
{
    HRESULT hr = S_OK;
    IObjectWithSite* pows = NULL;

*ppObject = NULL;

if(pUnkOuter != NULL)
        {
        hr = CLASS_E_NOAGGREGATION;
        goto Error;
        }
    if(hr = FAILED(TestExtension::Create(&pows)))
        {
        goto Error;
        } if(FAILED(hr = pows->QueryInterface(riid, ppObject)))
        {
        goto Error;
        }

Error:
    if(pows)
        {
        pows->Release();
        }
    return hr;
}
```

```
HRESULT MyClassFactory::LockServer(
    BOOL fLock
    )
{
    if(fLock)
        {
        g_dwDLLRefCount++;
        }
    else
        {
        g_dwDLLRefCount--;
        }
    return(S_OK);
}

STDAPI DllGetClassObject(
    REFCLSID rclsid,
    REFIID riid,
    void** ppObject
    )
{
    HRESULT hr = S_OK;
    MyClassFactory *pFactory = NULL;

if(rclsid == CLSID_TESTEXT)
        {
        pFactory = new MyClassFactory;
        if(!pFactory)
            {
            hr = E_OUTOFMEMORY;
            goto Error;
            } if(FAILED(hr = pFactory->QueryInterface(riid, ppObject)))
            {
            goto Error;
            }
        }
    else
        {
        hr = CLASS_E_CLASSNOTAVAILABLE;
        goto Error;
        }

Error:
    if(pFactory)
        {
        pFactory->Release();
        }
    return(hr);
}

STDAPI DllCanUnloadNow()
{
```

```
    if(g_dwDLLRefCount)
        {
        return S_FALSE;
        }
    else
        {
        return S_OK;
        }
}

STDAPI DllRegisterServer(void)
{
    HRESULT hr = S_OK;
    HKEY hKeyCLSID = NULL;
    HKEY hKeyInproc32 = NULL;
    DWORD dwDisposition;
    HMODULE hModule;
    TCHAR szName[MAX_PATH+1];

if(ERROR_SUCCESS != RegCreateKeyEx(HKEY_CLASSES_ROOT,
            TEXT("CLSID\\{") CLSIDTEXT_TESTEXT TEXT("}"),
            NULL, TEXT(""), REG_OPTION_NON_VOLATILE, KEY_ALL_ACCESS,
NULL,
            &hKeyCLSID, &dwDisposition))
        {
        hr = E_FAIL;
        goto Error;
        } if(ERROR_SUCCESS != RegSetValueEx(hKeyCLSID, TEXT(""), NULL,
REG_SZ, (BYTE*) TEXT("Demo Plugin"), sizeof(TEXT("Demo Plugin"))))
        {
        hr = E_FAIL;
        goto Error;
        } if(ERROR_SUCCESS != RegCreateKeyEx(hKeyCLSID,
TEXT("InprocServer32"),
            NULL, TEXT(""), REG_OPTION_NON_VOLATILE, KEY_ALL_ACCESS,
NULL,
            &hKeyInproc32, &dwDisposition))
        {
        hr = E_FAIL;
        goto Error;
        } hModule = GetModuleHandle(IMAGENAME);
    if(!hModule)
        {
        hr = E_FAIL;
        goto Error;
        } if(GetModuleFileName(hModule, szName, sizeof(szName))==0)
        {
```

```
        hr = E_FAIL;
        goto Error;
        } if(ERROR_SUCCESS != RegSetValueEx(hKeyInproc32, TEXT(""), NULL,
REG_SZ, (BYTE*) szName, sizeof(TCHAR)*(lstrlen(szName)+1)))
        {
        hr = E_FAIL;
        goto Error;
        }

Error:
    if(hKeyInproc32)
        {
        RegCloseKey(hKeyInproc32);
        }
    if(hKeyCLSID)
        {
        RegCloseKey(hKeyCLSID);
        }
    return(hr);
}

STDAPI DllUnregisterServer(void)
{
    HRESULT hr = S_OK;

if(ERROR_SUCCESS != RegDeleteKey(HKEY_CLASSES_ROOT,
            TEXT("CLSID\\{") CLSIDTEXT_TESTEXT
TEXT("}\\InprocServer32")))
        {
        hr = E_FAIL;
        goto Error;
        }
    if(ERROR_SUCCESS != RegDeleteKey(HKEY_CLASSES_ROOT,
            TEXT("CLSID\\{") CLSIDTEXT_TESTEXT TEXT("}")))
        {
        hr = E_FAIL;
        goto Error;
        }

Error:
    return(hr);
}
```

APPENDIX B

```
/****************************************************************************

File: PeExt.h
    Purpose: Phone Event Extension mechanism

History:
        Created - KK 6-18-2
*/ pragma once

/*
Phone app extensions are COM objects.

You register your extension class ID in the registry by creating a new key
like:
HKEY_LOCAL_MACHINE\Software\Microsoft\Shell\Extensions\Generic\Phone\Events\<CL
ASS_ID>

Your extension object should support IObjectWithSite and IDispatch (documented
in MSDN)

*/

// Events that are sent to the IDispatch::Invoke method of the extension
object.
#define PEDISP_CALLER_ID      100 // Param0 [VT_BSTR] - caller ID informaton of
current call
#define PEDISP_INCOMING       101 // Param0 [VT_INT] - number of incoming calls
#define PEDISP_TALKING        102 // Param0 [VT_INT] - number of talking calls
#define PEDISP_HELD           103 // Param0 [VT_INT] - number of held calls
#define PEDISP_CONNECTED      104 // Param0 [VT_INT] - total number of connected
calls (held + talking)
#define PEDISP_NEW_SITE_HWND  105 // Param0 [VT_UINT] - Hwnd of the new site window. Clients can also
retrieve this from IOleWindow::GetWindow
```

What is claimed is:

1. A mobile communication device, comprising:
    a memory encoded with computer-executable components comprising:
        a phone component executable on the mobile communication device that is configured to perform actions relating to wireless communications for the mobile communication device;
        a registration component executable on the mobile communication device that is configured to register software extensions on the mobile communication device for interacting with the phone component, wherein the registration component is configured to enable the software extensions to receive notifications associated with wireless communications handled by the phone component and control operations that are associated with the phone component, wherein, upon registration, the software extensions are enabled to send information to be displayed on a user interface associated with the phone component;
        a notification component executable on the mobile communication device that is configured to send a notification on the mobile communication device in response to receipt of a wireless communication by the phone component to a first software extension that is registered to receive the notification;
            the notification component sending the notification on the mobile communication device to a second software extension that is registered to receive the notification from the phone component; and
            an operation of the phone component being controllable from at least one of the first software extension and the second software extension.

2. The mobile communication device of claim 1, wherein the user interface is configured to display a digital photograph in response to an operation performed by one of the registered software extensions.

3. The mobile communication device of claim 2, wherein the operation performed by one of the registered software extensions associates the digital photograph with caller identity (ID) information received from the notification component.

4. The mobile communication device of claim 1, wherein at least one of the software extensions displays data directly on a user interface of the mobile communication device.

5. The mobile communication device of claim 1, wherein the phone component receives data from at least one of the software extensions to display on the user interface.

6. The mobile communication device of claim 1, wherein the notification includes data related to the wireless communication comprising location information.

7. The mobile communication device of claim 1, wherein the phone component is incorporated into an operating system of the mobile communication device.

8. A method, comprising:
    determining a wireless event at a phone component on a mobile device that performs actions relating to wireless communications on the mobile device;
    sending a notification on the mobile device, in response to determining the wireless event at the phone component, to a first software extension on the mobile device that is registered with the phone component to receive the notification;
    sending the notification on the mobile device, in response to determining the wireless event at the phone component, to a second software extension on the mobile device that is registered with the phone component to receive the notification from the phone component; wherein the first software extension and the second software extension are registered with the phone component and are enabled to receive the notifications that are associated with wireless communications handled by the phone component and controlling operations that are associated with the phone component,
    receiving, in response to sending the notification, from at least one of the first software extension and the second software extension, information to be displayed on a user interface associated with the phone component; and
    displaying, in the user interface associated with the phone component, the information received from the at least one of the first software extension and the second software extension.

9. The method of claim 8, wherein updating the display comprises displaying a digital photograph on the display.

10. The method of claim 9, wherein sending the notification comprises sending caller identity (ID) information that is used by at least one of the first software extension and the second software extension to determine the digital photograph to display.

11. The method of claim 8, wherein displaying comprises the at least one of the first software extension and the second software extension displaying data directly on the user interface.

12. The method of claim 8, wherein determining the wireless event at the phone component comprises determining at least one of: a new call; a call ended; and a call on hold.

13. The method of claim 8, wherein sending the notification comprises including at least one of: location information with the notification and caller ID information with the notification.

14. The method of claim 8, wherein the phone component is incorporated into an operating system of the mobile device.

15. The method of claim 8, further comprising:
    displaying, in response to determining the wireless event at the phone component, at least one trigger in the user interface associated with the phone component; and
    sending the notification to the at least one software extension based on activation of the at least one trigger displayed on the user interface.

16. The method of claim 8, wherein displaying the information received from the at least one of the first software extension and the second software extension comprises displaying the information without disrupting operations of the phone component.

17. A computer-readable storage device having computer instructions stored thereon for performing actions, comprising:
    determining when a telephone call is received on a mobile device;
    sending a notification, on the mobile device in response to receiving the telephone call, to at least one software extension on the mobile device that is registered with a phone component on the mobile device that performs actions relating to wireless communications on the mobile device; wherein each of the at least one software extension that is registered with the phone component and is configured for receiving one or more notifications that are associated with wireless communications handled by the phone component and controlling one or more operations that are associated with the phone component;

receiving, in response to sending the notification, from the at least one software extension, information to be displayed on a user interface associated with the phone component; and displaying, in the user interface associated with the phone component, the information received from the at least one of the software extensions.

18. The computer-readable storage device of claim 17, wherein sending the notification comprises sending caller identity (ID) information that is used by the at least one of the software extensions to determine a digital photograph to display on the display that is associated with the phone component.

19. The computer-readable storage device of claim 17, wherein displaying the user interface that is associated with the phone component comprises the at least one software extension displaying data directly on the on the user interface associated with the phone component.

20. The computer-readable storage device of claim 17, wherein sending the notification in response to receiving the telephone call comprises including at least one of: location information and caller ID information with the notification.

* * * * *